United States Patent [19]

Burkeen et al.

[11] Patent Number: 4,630,390
[45] Date of Patent: Dec. 23, 1986

[54] FISHING GEAR PERMITTING SWITCHING TO HEAVY LINE FOR LANDING

[76] Inventors: Ralph D. Burkeen, 1033 Crescent Ct.; Ron Labender, 440 Lakewood Ter., both of Round Lake, Ill. 60073

[21] Appl. No.: 738,986

[22] Filed: May 29, 1985

[51] Int. Cl.$^4$ .............................................. A01K 91/00
[52] U.S. Cl. .................................................. 43/43.11
[58] Field of Search ........................... 43/43.11, 43.1

[56] References Cited

U.S. PATENT DOCUMENTS

| | | | |
|---|---|---|---|
| 541,789 | 6/1895 | Kunzelman | 43/43.11 |
| 1,296,057 | 3/1919 | Ellsworth. | |
| 2,479,642 | 8/1949 | Schiffmann | 43/43.11 |
| 2,734,304 | 2/1956 | Yulich | 43/43.11 |
| 2,772,508 | 12/1956 | Greenlee | 43/43.11 |
| 3,057,107 | 10/1962 | Finnicum | 43/43.11 |
| 3,375,602 | 4/1968 | Clark et al. | 43/17.2 |

Primary Examiner—Gene P. Crosby
Attorney, Agent, or Firm—Laurence R. Brown

[57] ABSTRACT

Fishing with natural bait action is achieved by using a very light line leader attached to the hook, and fortifying it by transfer to a heavy line after the fish is hooked. The mechanism for doing this is a rotatable spool upon which a length of light line and a length of heavy line is wound in opposite directions so that unwinding heavy line (attached to a pole) from the spool will wind up the light line extended for fishing. A short length of heavy line near the hook will thus be wound on the spool for landing a fish with the heavy line. For casting, the spool is covered with a rubber-like membrane through which the heavy line is passed. A slit in the membrane provides enough friction with a knot in the heavy line to retain the length of heavy line spooled up until a fish is caught.

12 Claims, 7 Drawing Figures

U.S. Patent Dec. 23, 1986 Sheet 1 of 2 4,630,390
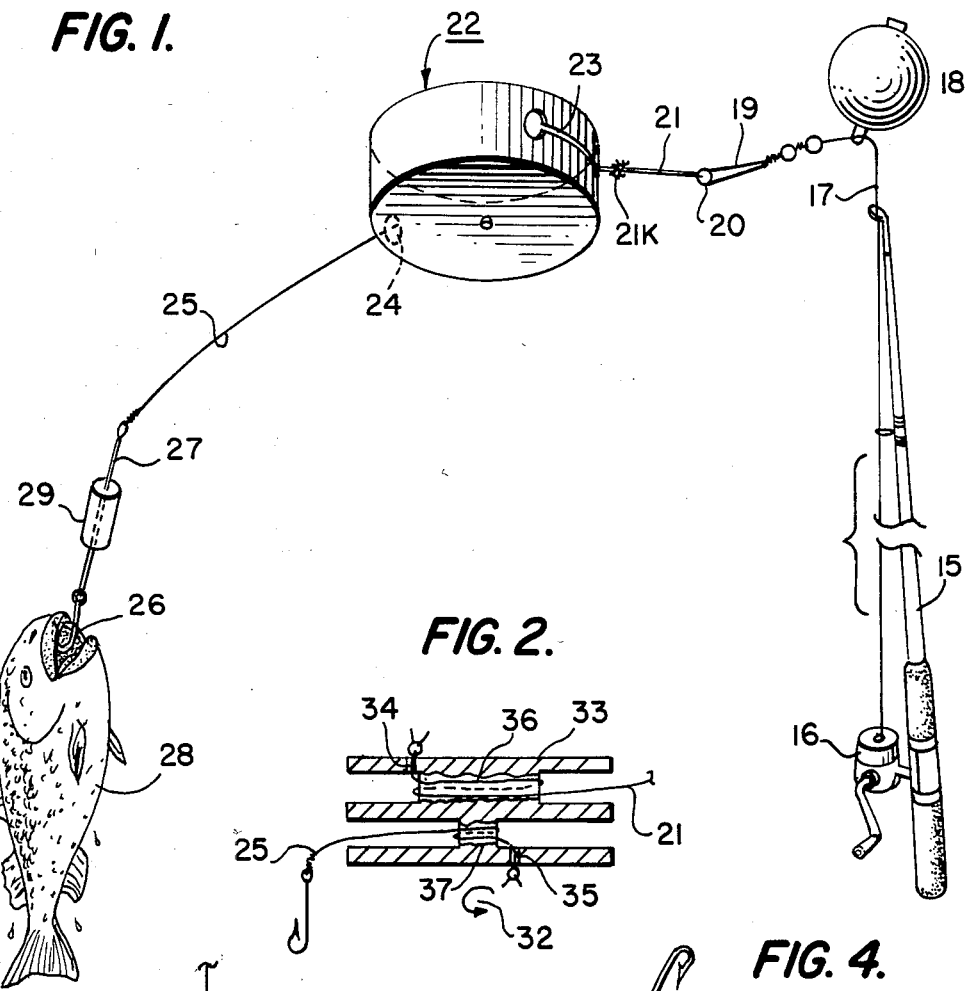
FIG. 1.
FIG. 2.
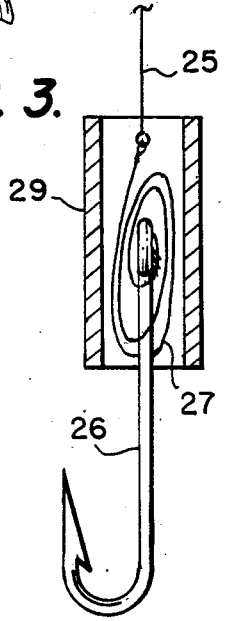
FIG. 3.
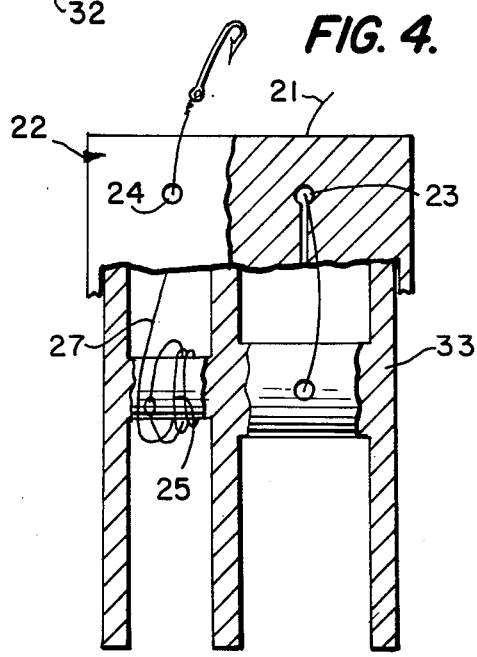
FIG. 4.

FISHING GEAR PERMITTING SWITCHING TO HEAVY LINE FOR LANDING

TECHNICAL FIELD

This invention relates to fishing tackle and more specifically it relates to tackle for fishing with very light leaders to hook a fish including a mechanism to substitute heavy line for landing the fish.

BACKGROUND ART

A significant problem in the fishing arts is that the big ones sometimes get away by breaking a line. Yet it is highly desirable to use very light leaders so that the bait will behave naturally and not be unusually restricted in movement by heavy line, which results in fewer catches.

It has been proposed in U.S. Pat. No. 1,296,057, W. Ellsworth, to put a spring in the line to absorb impacts that would tend to break the line. However, this only prevents rupture for special circumstances of a heavy strike, or short reactions.

A heavy auxiliary line is used for retrieval of snagged hooks in U.S. Pat. No. 3,375,602, J. M. Clark et al. However, this is not for landing heavy fish on an underrated line strength.

Copending U.S. application Ser. No. 517,660—R. Burkeen, filed July 27, 1983, now U.S. Pat. No. 4,574,517, provides for substituting for a light leader a heavy substitute parallel strengthening member after a bite is received. The particular mechanism used for this, however, is generally limited to short leader lengths, which cannot take full advantage of the natural behavior of the bait. Furthermore, the required extra hardware in the vicinity of the bait could spook a fish or offset the advantages of natural bait action by acting as a sinker on the line.

Specialty fishing rigs are many times limited for use in one special type of fishing style, such as bottom fishing with a heavy sinker or float fishing. It is particularly inconsistent in accordance with the objectives of this invention to provide a natural hookbait action by use of a very light leader, while using a heavy sinker, for example. Sinkers used where currents are strong to hold the bait in a desired location, in most cases reduce catches because a nibble can go undetected, and thus the hooking of a lightly biting fish by action of the fisherman is inhibited.

Problems are encountered in casting a rig under various conditions. Thus, a sinker could be very helpful in attaining a long cast. However, that is inconsistent with the desire for natural bait action possible with a light sinkerless leader, and the desire to detect nibbles.

It is an objective of this invention to provide a fishing rig that may be used under a wide range of fishing conditions with a light leader for hooking fish and a mechanism for substituting a heavier line for landing the big ones.

A general objective of the invention is to overcome the foregoing problems and inconsistencies of the prior art.

Other objects, features and advantages of the invention will be found throughout the following description, drawing and claims.

DISCLOSURE OF THE INVENTION

A desired length of light leader terminated in a hookbait assembly is used for fishing to permit natural bait action for more likelihood of attracting fish. This leader is connected with a heavier line manipulated usually by a fishing pole and reel in such a way that it does not reach the pole, so that the light line leader is not worn by frictional contact with the usual metal eyelets over which a line is passed to the reel.

In order to isolate any sinker or weight used in casting or in holding the bait in place in a current so that it does not interfere with the unimpeded transfer of a nibble to the fisherman, a rotating spool assembly is used with heavy line wound therearound and attached thereto for connection to the heavy line on the pole. The light leader length is wound around the spool in the opposite direction so that a nibble will be transmitted directly to the fisherman without impediment of a sinker weight, or the like. The spool itself may serve as a heavier sinker that can aid in casting and in holding the line in place in a current without reducing the feel for a nibble.

The spool itself is encased in a membrane outer layer having a slit which frictionally grabs and holds inside the casing a knot in the heavy line portion connected with the pole. This prevents premature winding up of the light leader onto the spool, such as when casting, but permits the knot to pass through the slit when pulled against the weight of a fish on the line.

In order to prevent breakage of the light leader when landing a large fish the hook assembly has a short length of heavier leader. Thus, when the spool is cast with the heavy line rolled up onto the spool and the light leader extending therefrom, the light leader permits the bait and hook to move around in underwater currents and during nibbles in a natural manner. After a fish is hooked, the weight of the fish will overcome the friction of the casing slit and permit the spool to wind up the light leader, which may be at a slow rate depending upon diameters of the spool for light and heavy line, until the short length of heavier leader near the hook is spooled, thereby to effectively provide a continuous length of heavy line for the brute force landing of the fish as accomplished by the medium of the frictional winding of the short length of heavy line about the spool over the spooled light leader portion.

BRIEF DESCRIPTION OF THE DRAWINGS

In the drawings, wherein like reference characters are used in the various views to indicate similar features, FIG. 1 is a partly broken away sketch of the fishing rig of this invention in use;

FIG. 2 is a side view, partly in section, of the spool and line connection array afforded by this invention;

FIG. 3 is a fragmental view of means for fore-shortening a length of heavy leader line close to the hook;

FIG. 4 shows the spool broken partly away with the leader rolled up;

THE PREFERRED EMBODIMENTS OF THE INVENTION

Figure 5:
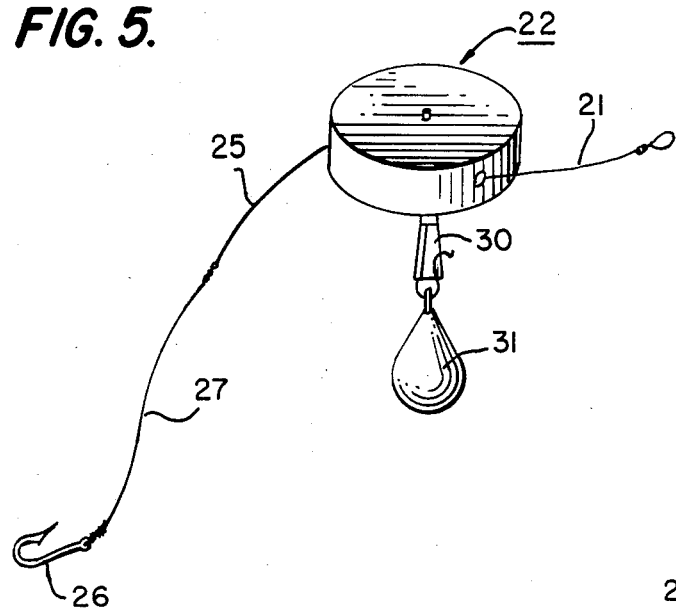
FIG. 5 is a sketch of an embodiment of the invention wherein the spool assembly comprises a sinker assembly.

In FIG. 1, a fishing pole 15 has a reel 16 feeding a heavy line 17 upon which a bobber 18 is mounted and a snap-swivel assembly 19 for receiving a hook and leader. This assembly is conventional, but is used in fishing in a different manner as a result of this invention. This invention thus provides a rig replacing a conventional leader and hook, as shown attached by means of swivel ring 20 to the snap 19.

A heavy length of line 21 is wound upon a rotatable spool, not shown in this view, mounted within casing 22 having an outer cylindrical sleeve with openings 23 and 24 for feeding in and out respectively the heavy line length 21 and the light leader length 25, both of which are at their inner ends affixed to the spool for winding thereupon respectively in different directions, as seen more clearly from FIG. 2. The internal spool principal of operation is well known in other combinational interactions, as for example, used for casting a fishing float with the leader fully wound and let out by sinker action at the landing site. See U.S. Pat. No. 541,789—J. R. Kunzelman, June 25, 1895.

The light leader length 25 is unwound from the spool when fishing to a measured length, thereby to permit the bait upon hook 26 to move freely and behave naturally in the water about the fishing place without restriction because of the weight and stiffness of a heavy line, and therefore attracting more fish than possible with a stiff heavy leader.

As used in fishing, the outer sleeve of the casing is of an elastic rubber-like membrane with a slit 23 which will frictionally squeeze the heavy line 21 with enough friction on a knot in the heavy line held by the slit inside casing 22 to permit the spool assembly 22 to be cast with the light leader 25 extending out of the hole 24. The weight of the spool assembly can vary depending upon the amount of sinker desirable for the particular fishing conditions, and as shown in FIG. 5 may have additional weight attached by means of snap 30 and supplemental sinker 31. The assembly 22 also may be used with or without bobber 18 depending upon whether bottom fishing or float fishing is desired.

When fishing with the light leader line 25 extended, a fish 28 may chase, play with and nibble bait on hook 26 as it, with a worm, or like bait, acts in a way more natural to the fish than if confined by a heavy leader. Thus, the likelihood of getting a bite is greater. However, if the fish 28 is large enough, the light leader 25 may be broken before a fish is landed. Thus, the spool within casing 22 winds up the light leader 25 as the knot 21k in heavy line 21 is pulled out of the casing against the friction of the slit 23, as possible with the weight of the fish. Winding of the light line 25 caused by different spool diameters inside the casing contributes to the ability of the light leader to hold a large fish in the initial part of the landing. As the leader is nearly rolled up, the small length 27 of heavier leader near the hook 26 is wound upon the spool as seen from FIG. 4 to serve by winding friction to couple the heavy line 21 to the heavy leader 27 by means of the intermediate spool to serve in landing the fish. Note that there is a length of the heavy line extending from hole 24 when the heavy line 21 is completely unspooled, so that the spool does not interfere with the hook.

A further advantage of this rig is that nibbles are readily felt and are not inhibited by an intervening sinker as in the case of conventional fishing. Thus, as seen from FIG. 2, a tug at light leader line 25 will cause a counterclockwise rotation of spool 33, as indicated by arrow 32 and transmit that tug to a greater extent to the heavy line 21 because of the difference in spool diameters. Conversely, reeling line 21 off the spool will cause the light leader line 25 to be reeled upon the spool. Note that the respective lines 21 and 25 are passed through respective holes in the spool flanges and knotted for retention in place. Clearly therefore the leader 25 length is not limited and may be paid out as far as the amount of line 21 wound on the spool 33 permits. The larger hub 36 provided in the heavy line compartment defined by the spool flanges provides a different ratio of spooling or unspooling of the heavy and light lines because of smaller diameter hub 37 upon which the light line leader is spooled.

A small plastic sleeve 29 may be carried about the leader 27, if desired, to permit looping of the heavy leader portion 27 of the leader 25 as shown in FIG. 3. A gentle tug on hook 26 will pull the line out of the sleeve. This is desirable for keeping the light leader action on the bait without interference of the heavy leader portion 27.

Figure 6:
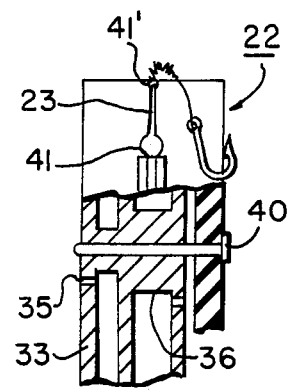
FIG. 6 is a partly cut away side view of a typical spool assembly afforded by this invention.

In FIG. 6, the spool 33 is shown rotatable on pin 40 within the casing 22. The preferred outlet hole and slit 23 for the heavy line is shown in different perspective. The teardrop shape provides free reelup without the friction of the slit on the heavy line after a bite and during retrieval. The slit 23 further advantageously provides a neat storage slot for receiving the light line leader and retaining it when wound into place circumferentially about the casing 22, as shown by the sectioned ends of the line 41.

Figure 7:
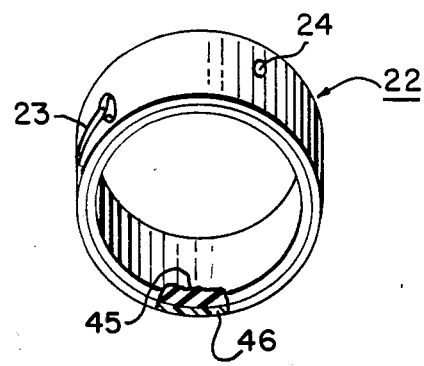
FIG. 7 is a perspective view of a significant portion of the spool casing as provided by this invention.

The outer casing construction is exemplified in FIG. 7, wherein a stiffer protective casing cylindrical portion 45 may have an outer membrane 46 of plastic or the like suitable for providing the friction to the heavy line by means of the slit construction 23. Corresponding larger apertures in the stiffer inner core 45 permit the outer membrane to process the lines.

Having therefore advanced the art with novel and useful fishing gear, those features of novelty believed descriptive of the spirit and nature of the invention are defined with particularity in the following claims.

We claim:

1. Fishing gear for fishing with a light line that permits bait to behave normally capable of landing large fish when hooked, comprising in combination, a rotatable spool having light line and heavy line lengths attached to the spool for winding thereon in opposite directions with free ends extending from the spool, means for retaining the heavy one of the line lengths wound on the spool with a significant portion of the light line length extending from the spool during casting so that the heavy line may be unwound from the spool when a fish is hooked to wind up the light line onto the spool, means for attaching the free end of the heavy line to a fishing line, and a length of heavy line with a hook attached to the end of the light line to reel onto the spool after the light line is fully wound thereon to thereby effectively provide a continuous heavy line for landing the fish coupled by the frictional force of the heavy line portion with the hook wound about the spool through the spool and the connection of the heavy line to the spool to the heavy line length thereon extending to the means for attaching to the fishing line.

2. Fishing gear as defined in claim 1, wherein the spool comprises an assembly having enough weight to act as a sinker in the line.

3. Fishing gear as defined in claim 1, wherein the spool comprises three parallel cylindrical flanges extending from a central hub thereby defining two separate compartments for winding of the heavy line and light line respectively, and apertures through the flanges from each of the compartments adjacent the hub for passing through and securing by a knot outside the respective compartments the individual ends of the respective heavy line and light line for winding on the spool.

4. Fishing gear as defined in claim 1 including means for securing in a foreshortened folded array the length of heavy line with the hook attached so that the hook protrudes.

5. Fishing gear as defined in claim 1, wherein the spool is encased in a flexible rubber-like cylindrical membrane having an aperture therethrough for feeding the heavy one of the line lengths from the spool, which aperture comprises said menas fo retaining the heavy line by means of a feed through hole leading into a circumferentially oriented slit of such frictional characteristic that it will retain a knot in the heavy line length within the membrane during casting without unreeling the heavy line from the spool.

6. Fishing gear as defined in claim 5, wherein the heavy one of the line lengths has defined between the free end and the slit a knot of large enough dimension that it will not go through the slit during casting.

7. Fishing gear as defined in claim 5, wherein the light line length is wound about the circumference of the spool casing to enter into the slit and be frictionally held in place thereby.

8. Fishing gear as defined in claim 1, further comprising, a fishing rod having said fishing line extending therefrom, and said means for attaching including coupling means connecting the fishing line to the free end of the heavy line.

9. Fishing gear as defined in claim 8 having a bobber attached between the spool and the fishing rod.

10. Fishing gear as defined in claim 1, wherein the spool has two hubs of different diameter with the light line wound upon the smaller diameter hub and the heavy line upon the larger diameter hub.

11. A fishing rig comprising in combination, a fishing line having in sequence between a pole and a hook: a bobber, a heavy length of line, a rotatable spool, and a light length of line, with portions of the light line and heavy line wound on the spool in opposite directions so that the light line is spooled when the heavy line is unspooled and vice versa, wherein the spool is encased in a cylindrical membrane of rubber-like constituency having a slit therein for feeding the heavy line from the spool to the pole, the heavy line has a knot therein for positioning on the spool within the membrane when the light line is substantially unwound from the spool, and said slit and knot have relative dimensions that the heavy line is frictionally retained during casting without unwinding the heavy line from the spool but passes through the slit when a fish is hooked.

12. A rotatable spool assembly including a spool encased in a substantially cylindrical casing having an outer membrane of constituency for journalling without significant wear a line passing through an aperture therein, a slit in the membrane, a first line extending into the slit and affixed to the spool for winding thereon in one direction, a further line extending through the membrane and attached to the spool and wound thereon in a direction opposite that of the first line, and means in the first line for engaging the slit dimensions to frictionally grip the line to retard reeling of that line off the spool during casting but permitting passage through the slit when a fish is hooked.

* * * * *